March 17, 1953     S. T. TRANSEAU     2,631,460
TRACTION WHEEL DRIVE
Filed Oct. 16, 1951
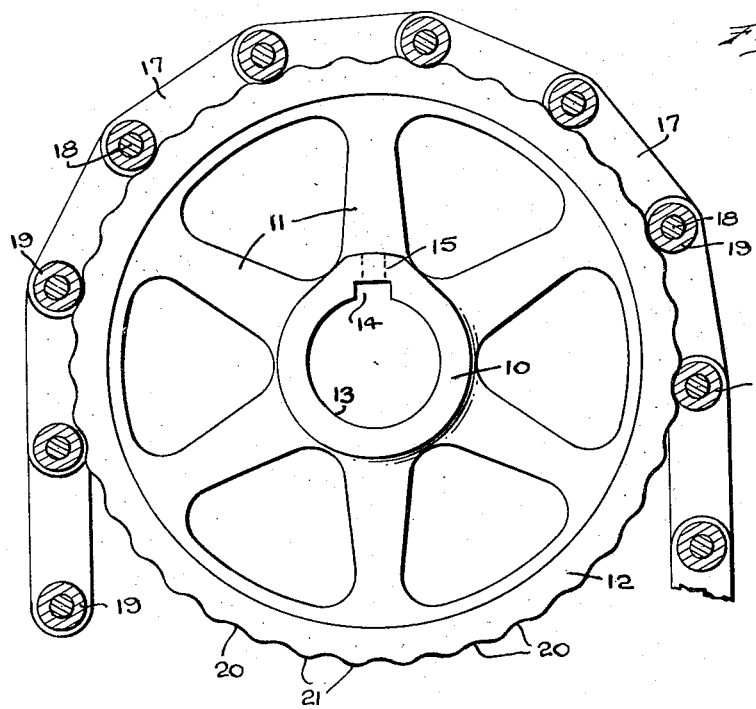
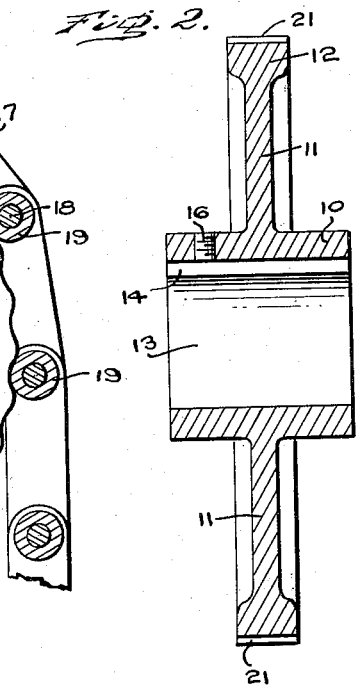
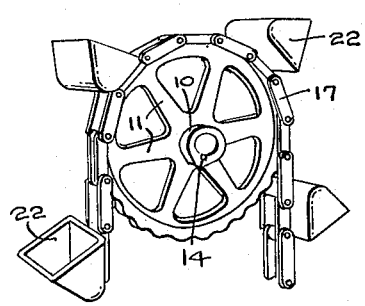
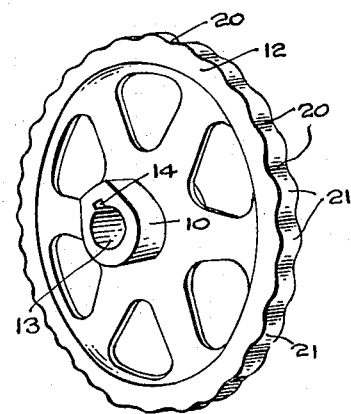
INVENTOR
SHERMAN T. TRANSEAU
BY *Lee Edelson*
ATTORNEY Patented Mar. 17, 1953

2,631,460

UNITED STATES PATENT OFFICE 2,631,460

TRACTION WHEEL DRIVE

Sherman T. Transeau, Riverside, N. J.

Application October 16, 1951, Serial No. 251,464

3 Claims. (Cl. 74—229)

The present invention relates to chain drives for bucket elevators and the like and more particularly to an improved traction wheel therefor of the type shown and described in my copending application, Serial No. 194,584, filed November 8, 1950, of which this application is a continuation-in-part.

In bucket elevators heretofore in use there have been two types of drive wheels generally used to transfer the torque of a driven shaft to the elevator chain, one of which is the common toothed sprocket drive wheel and the other the well-known traction wheel having a smooth rim designed to frictionally engage the chain. Both have inherent disadvantages as will be pointed out.

In the toothed sprocket wheel, a tooth on the wheel contacts the barrel or other part of the chain link on the up run and pulls the chain over and through the arc of the drive or head wheel, while releasing its contact on the down run of the chain. This sprocket type wheel is positive in its action in that any and all torque in the head shaft is delivered to the elevator chain without any appreciable slippage between the drive wheel and the chain. It is, however, subject to the disadvantage that it creates excessive wear on parts and breakage. There is ever present a continuous wear on both the tooth of the sprocket wheel and the elevator chain barrel or other parts due either to slippage of the chain barrel on the sprocket tooth, or to the rotation of the chain barrel against the sprocket tooth as the chain passes through the arc of the wheel. This wear and grinding action of the chain parts while in contact with the tooth of the sprocket wheel is such that it reduces the chain life to as little as ten per cent of the normal life of the chain.

The breakage referred to in the case of the sprocket wheel drive is due to the fact that the sprocket wheel is a positive drive so that when the elevator becomes jammed by overloading or because of a foreign object entering the elevator system, it is wrecked due to the breakage of either the chain or the tooth of the wheel unless the torque is released through the use of suitable shear pin, slip coupling or other safety devices. Furthermore, the cost of maintenance of the material-handling equipment, and, consequently, the cost per ton of material handled is materially increased because as the chain joints wear, the original pitch of the chain is increased and as the barrels of the chain wear the sprocket wheel teeth, the pitch of the latter is also increased. By reason of this pitch variation, not only in the chain but also in the sprocket wheel, the replacement of a worn chain makes it absolutely necessary to also replace the sprocket wheel in order to have them both of the same original pitch.

In the traction wheel type of drive, the torque from the elevator drive shaft is transferred to the elevator chain through the friction of the chain coming in contact with the rim of the traction wheel.

Among the advantages of this traction wheel type is quietness of operation. Also, the life of the chain is at its maximum due to the fact that practically all of the grinding motion present in the tooth sprocket wheel is eliminated. Furthermore, since the traction wheel has a smooth surface, which is subject to little, if any, localized wear, the pitch of the chain is not a factor, and, consequently, when the chain is replaced, it is unnecessary to replace the traction wheel. Another advantage is that only a given torque can be transferred from the elevator drive shaft to the chain. When this torque is exceeded due to a foreign object entering the elevator system, the chain slips on the traction wheel, making it impossible to wreck the elevator. Such being the case, it is not necessary to incur the expense of installing shear pins, slip couplings or other such safety devices.

The disadvantages of the traction wheel drive are as follows: Due to the fact that only a fixed amount of torque can be transferred from the traction wheel to the chain, it is often impossible to drive the elevator chain by the conventional traction wheel. The factors determining the amount of torque transferred from the traction wheel to the chain are the coefficient of friction between the two metals of the traction wheel and the chain and also the weight of the material per cubic foot being handled in the elevator system. Up to a given weight of the material being handled by the chain elevator, the tractive pull will be normally sufficient when it is 200% of the necessary pull to operate the elevator. When, however, the tractive pull falls below this normal factor of 200%, the slippage between the chain and the traction wheel will increase to the point where the transfer of torque from the traction wheel to the chain is insufficient to elevate the load. Therefore, for satisfactory operation of the traction wheel drive, it is absolutely essential that a competent engineer have before him all pertinent data for efficient installation and operation of a chain elevator driven by the conventional traction wheel.

Having in mind the foregoing, it is among the principal objects of the present invention to provide an improved construction of traction wheel the use of which obviates the disadvantages of both the toothed sprocket drive wheel and the conventional traction drive wheel, while at the same time retaining their advantages.

Another object of the invention is to provide a traction wheel in which a safety factor is introduced in that the torque from the wheel to the chain can be increased or decreased according to conditions.

A still further object is to provide a traction wheel wherein any amount of torque can be delivered to a chain by the wheel without causing breakage damage such as occurs through a positive drive.

Still another object is to provide a traction wheel having a combined torque-traction chain-engaging rim which is made up of a plurality of convex projections or shoulders which are so spaced equally about the circumference of the wheel rim as to present at least one projection or shoulder freely between each adjoining pair of the wheel-engaging barrels of the chain and which are of such total number that the quotient obtained by dividing said total number by the number of projections or grooves per pitch of the chain is other than a whole number. By so designing the wheel, there is provided one extra so-called "hunting" shoulder in its chain-engaging rim, which extra shoulder causes the chain link barrels to shift forward to the extent of one shoulder or projection upon each revolution of the wheel, thereby insuring even distribution of wear over the full circumference of the wheel rim and so materially prolonging the life of the wheel.

Other objects and advantages of the invention will appear more fully hereinafter, it being understood that the present invention consists substantially in the combination, construction, location and relative arrangement of parts, all as described more fully hereinafter, as shown in the accompanying drawings and as finally pointed out in the appended claims.

In the accompanying drawings,

Figure 1 represents a side elevation of a traction wheel embodying a preferred form of the present invention and showing a portion of an elevator chain with the link barrels in section to illustrate the driving relation of the wheel;

Figure 2 represents a section through the traction wheel per se with the chain omitted;

Figure 3 is a perspective view of a wheel constructed in accordance with the principles of the present invention; and Figure 4 is a perspective view showing the wheel operatively fitted with a bucket-type elevator chain of which latter only a portion is shown.

Referring now to the drawings, it will be observed that they show a traction wheel which, constructed in accordance with the principles of the present invention, comprises a hub 10 having radially disposed spokes 11 connected terminally with a circumferential rim 12 for concentric turning movement. The hub 10 forms an internal bore 13 to receive a driven shaft and has a keyway 14 to receive the usual key in such a shaft for transmitting motion to the wheel. A threaded opening 15 traverses the hub 10 in alinement with the keyway 14 to receive a set screw 16 (shown in Figure 2) to lock the wheel in place upon the driven shaft.

The traction wheel of the invention is shown for use with a bucket elevator chain of the type formed by a plurality of chain links 17 connected, one to another, by transverse pins 18 respectively forming pivotal bearings for cylindrical chain link barrels 19 transversely disposed across the periphery of the rim 12 for traction driving by the wheel rim 12. Thus, the bucket elevator chain is in the form of an endless articulated unit made up of a plurality of chain links with the barrels 19 of the several links spaced equally throughout the length of the elevator chain. While the drawing illustrates a bucket elevator chain, it will be apparent and accordingly it is to be understood that the traction wheel of the present invention is applicable for use in connection with any other type of endless chain made up of identical articulated links having uniformly spaced chain link barrels, such as those designated by the reference numeral 19, as, for example, endless chains employed for transmitting power from one shaft to another or for use in connection with conveyors other than bucket elevators.

For the purpose of developing the required traction for driving the endless chain, the periphery of the rim 12 of the wheel is provided with an undulating or corrugated curvilinear surface formed by a plurality of alternating open sided, transversely arranged concave grooves 20 and convex projections or shoulders 21, each of the grooves being formed on such a radius as to provide a traction surface generally complemental to the periphery of the barrel 19 which rides therein. The projection 21, thus formed between each pair of adjacent grooves 20, is shaped as a convex traction face of such radius as to cause it to merge smoothly into the continuing concave surfaces of the grooves 20. While the depth of the grooves 20 may be varied to increase or decrease the torque from the wheel to the chain, it is important that the depth should not be such as to transform the convex projections into an abutment corresponding to the action of a tooth, a construction specifically avoided by the present invention. To obtain the desired releasable torque action, the depth of the grooves 20 should be less than the radius of the barrel entering such grooves, while the curvature of each groove should be of a radius preferably, but not necessarily, equal to that of the chain link barrels. By the substantially uniform undulating surface the traction drive becomes a composite one of both torque and friction, the wheel, however, being self-releasing from the torque component when the elevator chain is subjected to overload or when its freedom of movement is impeded by a foreign object entering the elevator system. In Figure 4, the modified traction wheel of the present invention is shown as associated with a single bucket type chain, upon which the material-handling buckets 22 are mounted in any suitably spaced relation.

It will be particularly noted that the projections or shoulders 21 are so spaced uniformly about the periphery of the wheel as to provide for an equal plural number of said projections or shoulders to be embraced by each of the chain links which are in engagement with the wheel. Thus, as shown in Figure 1, four such projections or shoulders are provided per pitch of the chain, the chain pitch being, of course, the distance between the centers of successive barrels of the articulated chain links. Also, it will be noted that the total number of the projections or shoulders 21 spaced about the wheel periphery is such that the quotient obtained by dividing said total number by the number of said projections or shoulders per pitch of the chain is other than a whole number. Thus, in the wheel shown in Figure 1, four shoulders are provided per pitch of the chain shown operatively associated with the wheel, with a total number of thirty-eight shoulders formed on the wheel, this total number being indivisible by the pitch number to provide a whole number quotient.

Because of this relation between the total number of shoulders on the wheel and the number thereof per pitch of the associated chain, there is provided at least one extra "hunting" shoulder in the wheel periphery which causes the chain link barrels to progressively advance about the wheel to the extent of one shoulder for each revolution of the wheel. Of course, the total number of shoulders upon a given wheel may be varied as desired, but so long as said total number bears such relation to the pitch number as to provide other than a whole number quotient when the former is divided by the latter, the desired extra shoulder is made available to automatically effect shifting of the chain barrels progressively into contact with all shoulders of the wheel upon rotation of the latter through a plurality of revolutions. Thus, uniform wear is insured over the entire peripheral surface of the wheel with consequent prolongation of its service life.

The provision of a wheel having a plurality of projections or shoulders 21 per pitch of the chain is of decided advantage in that it lessens the shock to which the wheel is subjected when the wheel and its associated chain is operating under load. It will be apparent that the shock to which the system is subjected depends partially upon the magnitude of the load and partially upon the distance through which the chain slips relatively to the wheel. The greater the extent of slippage, the greater the shock and the possibility of damage to and breakage of the wheel and/or the chain. By providing a multiple number of shoulders within each link of the chain, i. e., per chain pitch, the permissible slippage of the chain operating under load is limited to but a fraction of the length of the chain pitch, which slippage, in the instance illustrated in Figure 1 wherein the number of shoulders is four for the pitch of the associated chain, is limited to a distance not exceeding one-third the length of the chain pitch.

From the foregoing, it will now be apparent that a novel traction wheel has been devised for driving endless chains for bucket elevator conveyors and the like, wherein the disadvantages of prior drive wheels, such as the toothed sprocket and traction wheel types, have been eliminated, while maintaining all the advantages thereof with added efficiency, safety, minimum repairs and minimum replacements. Furthermore, it will be evident that when the system is subjected to an overload or other impediment to free movement of the endless chain, the convex portions 21 of the traction wheel ride under the barrels of the chain links in engagement with the wheel and so permit the latter to function in the manner of a conventional smooth-surfaced traction wheel to relieve the system of all such torque as might seriously damage or cause breakage of the component elements of the system. On the other hand, under conditions of normal load or even temporary overload, the modified traction wheel of the present invention provides such increased traction or coefficient of friction between the wheel and the elevator chain as to materially increase the operating efficiency of the system as a whole.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed as new and useful is:

1. In combination with an endless chain of articulated links including a plurality of equally spaced transversely extending wheel engaging barrels, a traction wheel comprising a hub and interconnected rim, said rim having a combined torque-traction surface formed by a plurality of circumferentially spaced transversely extending concave grooves each of which is smoothly merged with its next adjacent groove by a transversely extending convex projection, said grooves being equally spaced and of such total number that the quotient obtained by dividing said total number by the number of grooves per pitch of said chain is other than a whole number.

2. In combination with an endless chain of articulated links including a plurality of equally spaced transversely extending wheel engaging barrels, a traction wheel comprising a hub and interconnected rim, said rim having a combined torque-traction surface formed by a plurality of circumferentially equally spaced transversely extending concave grooves each of which is smoothly merged with its next adjacent groove by a transversely extending convex projection, the number of grooves per pitch of said chain being greater than one and the quotient obtained by dividing the total number of said grooves by the number thereof per pitch of said chain being other than a whole number.

3. In combination with an endless chain of articulated links each having a transversely extending wheel engaging barrel, a traction wheel comprising a hub and interconnected rim, said rim having a combined torque-traction surface formed by a plurality of circumferentially spaced transversely extending concave grooves each of which is smoothly merged with its next adjacent groove by a transversely extending convex projection, the number of grooves per pitch of said chain being greater than one and the quotient obtained by dividing the total number of said grooves by the number thereof per pitch of said chain being other than a whole number.

SHERMAN T. TRANSEAU.

REFERENCES CITED

The following references are of record in the file of this patent:

UNITED STATES PATENTS

| Number | Name | Date |
| --- | --- | --- |
| 465,572 | Diebold | Dec. 22, 1891 |
| 598,014 | Schry | Jan. 25, 1898 |
| 601,525 | Pastor | Mar. 29, 1898 |
| 647,243 | Anderson | Apr. 10, 1900 |
| 1,008,330 | Helms | Nov. 14, 1911 |
| 2,572,601 | De Wilde | Oct. 23, 1951 |

FOREIGN PATENTS

| Number | Country | Date |
| --- | --- | --- |
| 412,879 | France | 1910 |